US009443389B2

(12) United States Patent
Anderson et al.

(10) Patent No.: US 9,443,389 B2
(45) Date of Patent: Sep. 13, 2016

(54) GAMING SYSTEM HAVING WAGERING FEATURES FUNDED BY EXTRA-CASINO ACTIVITIES

(71) Applicant: Bally Gaming, Inc., Las Vegas, NV (US)

(72) Inventors: Peter R. Anderson, Glenview, IL (US); Jeremy M. Hornik, Chicago, IL (US); Shridhar P. Joshi, Naperville, IL (US); Larry J. Pacey, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 14/828,696

(22) Filed: Aug. 18, 2015

(65) Prior Publication Data

US 2015/0356823 A1 Dec. 10, 2015

Related U.S. Application Data

(63) Continuation of application No. 14/083,556, filed on Nov. 19, 2013, now Pat. No. 9,142,089, which is a continuation of application No. 13/453,482, filed on Apr. 23, 2012, now Pat. No. 8,616,962, which is a continuation of application No. 12/600,976, filed as application No. PCT/US2008/006106 on May 14, 2008, now Pat. No. 8,187,088.

(60) Provisional application No. 60/930,806, filed on May 18, 2007.

(51) Int. Cl.
*G06F 17/00* (2006.01)
*G07F 17/32* (2006.01)

(52) U.S. Cl.
CPC .......... *G07F 17/3244* (2013.01); *G07F 17/32* (2013.01); *G07F 17/3255* (2013.01)

(58) Field of Classification Search
USPC .................................................... 463/16–26
See application file for complete search history.

(56) References Cited

U.S. PATENT DOCUMENTS

| | | | | |
|---|---|---|---|---|
| 8,393,956 | B2 | 3/2013 | Gagner et al. | 463/25 |
| 2003/0078101 | A1 | 4/2003 | Schneider et al. | 463/42 |
| 2004/0224746 | A1 | 11/2004 | Fong | 463/16 |
| 2006/0040730 | A1* | 2/2006 | Walker | G07F 17/3244 463/20 |
| 2006/0084496 | A1 | 4/2006 | Jaffe et al. | 463/20 |
| 2006/0105836 | A1* | 5/2006 | Walker | G07F 17/32 463/25 |
| 2006/0105837 | A1* | 5/2006 | Walker | G07F 17/32 463/25 |
| 2010/0069149 | A1 | 3/2010 | Kisenwether et al. | 463/26 |

(Continued)

OTHER PUBLICATIONS

Search Report in International Application No. PCT/US2008/006106, dated Jul. 4, 2011 (3 pages).

(Continued)

*Primary Examiner* — Ronald Laneau
(74) *Attorney, Agent, or Firm* — Nixon Peabody LLP

(57) ABSTRACT

A method of funding features of a wagering game, comprises receiving a first sum of money generated from extra-casino activity associated with at least one person and depositing the first sum into a feature fund. The method further comprises allocating the first sum to at least one account of the feature fund in accordance with a first rule set. The method further comprises, in response to a triggering event, withdrawing a second sum of money from the at least one account. The method further comprises funding at least one feature associated with the wagering game from the second sum of money and activating the funded feature.

20 Claims, 5 Drawing Sheets

(56) References Cited

U.S. PATENT DOCUMENTS

| | | | | |
|---|---|---|---|---|
| 2010/0167815 | A1 | 7/2010 | Gagner et al. | 463/25 |
| 2010/0216544 | A1 | 8/2010 | Hamlin | 463/25 |
| 2011/0124402 | A1 | 5/2011 | De Waal et al. | 463/25 |
| 2012/0142409 | A1 | 6/2012 | Kelly et al. | 463/25 |
| 2013/0150151 | A1 | 6/2013 | Gagner et al. | 463/25 |
| 2013/0157753 | A1 | 6/2013 | De Waal et al. | 463/25 |
| 2016/0027233 | A1* | 1/2016 | Gagner | G07F 17/32 463/25 |

OTHER PUBLICATIONS

Written Opinion in International Application No. PCT/US2008/006106, dated Jul. 4, 2011 (4 pages).

International Preliminary Report on Patentability in International Application No. PCT/US2008/006106, dated Jul. 21, 2011 (6 pages).

* cited by examiner

GAMING SYSTEM HAVING WAGERING FEATURES FUNDED BY EXTRA-CASINO ACTIVITIES

CLAIM OF PRIORITY AND CROSS-REFERENCE TO RELATED APPLICATIONS

This application is a continuation of U.S. patent application Ser. No. 14/083,556, which was filed on Nov. 19, 2013, now allowed, as a continuation of U.S. patent application Ser. No. 13/453,482, which was filed on Apr. 23, 2012, now U.S. Pat. No. 8,616,962 B2, as a continuation of U.S. patent application Ser. No. 12/600,976, which was filed on Nov. 19, 2009, now U.S. Pat. No. 8,187,088 B2, as a U.S. national stage of International Application No. PCT/US2008/006106, which was filed on May 14, 2008, and claims priority to U.S. Provisional Patent Application No. 60/930,806, which was filed on May 18, 2007, all of which are incorporated by reference herein in their respective entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming system having wagering features funded by extra-casino activities, such as online activities.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming systems with new types of bonus games to satisfy the demands of players and operators.

Traditionally, wagering games have been funded by coin or currency. Some developments included player tracking cards which allowed players to accumulate "reward points" or other non-economic points redeemable for prizes, gifts, or merchandise. One problem that arises is that as wagering games develop, a wide variety of features become offered to players as options or add-ons to the gaming experience. Another problem that exists is that such additional features require additional funding to compensate for the additional value, or expected value, returned to the player during play of the wagering game. This in turn causes yet another problem which is the undesirability of the extra expense to players, and players' inabilities to comprehend the value of the extra features vis-à-vis the extra charges incurred to play the wagering game. The conundrum facing many operators is how to offer the added features without overwhelming players with the added expense necessary to fund them. The present invention is directed to solving these and other problems.

SUMMARY OF THE INVENTION

According to one aspect of the present invention, a method of funding features of a wagering game comprises receiving a first sum of money generated from extra-casino activity associated with at least one person and depositing the first sum into a feature fund. The method further comprises allocating the first sum to at least one account of the feature fund in accordance with a first rule set. The method further comprises, in response to a triggering event, withdrawing a second sum of money from the at least one account. The method further comprises funding at least one feature associated with the wagering game from the second sum of money and activating the funded feature.

According to another aspect of the invention, a method of operating a wagering game comprises receiving a primary wager to activate the wagering game and determining if a first feature of the wagering game is eligible for activation. The method further comprises receiving a request from a player to activate the first feature, and receiving a secondary wager from a feature fund. The feature fund has a plurality of accounts and the feature fund is funded by monies generated from extra-casino activity associated with at least one person, the monies deposited into one or more of the plurality of accounts of the feature fund in accordance with a first rule set. The method further comprises allocating the secondary wager to fund the first feature in accordance with a second rule set and activating the first feature.

According to yet another aspect of the invention, a gaming system comprises a wager input device for receiving a primary wager from a player and at least one display for displaying a randomly selected outcome of a wagering game. The at least one controller is operative to (i) determine if a first feature of the wagering game is eligible for activation, (ii) receive a request from the player to activate the first feature, (iii) receive a secondary wager from a feature fund, the feature fund having a plurality of accounts, the feature fund funded by monies generated from online activity associated with at least one person, the monies deposited into one or more of the plurality of accounts of the feature fund in accordance with a first rule set, (iv) allocate the secondary wager to fund the first feature in accordance with a second rule set; and (v) activate the first feature.

According to yet another aspect of the invention, a computer readable storage medium is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
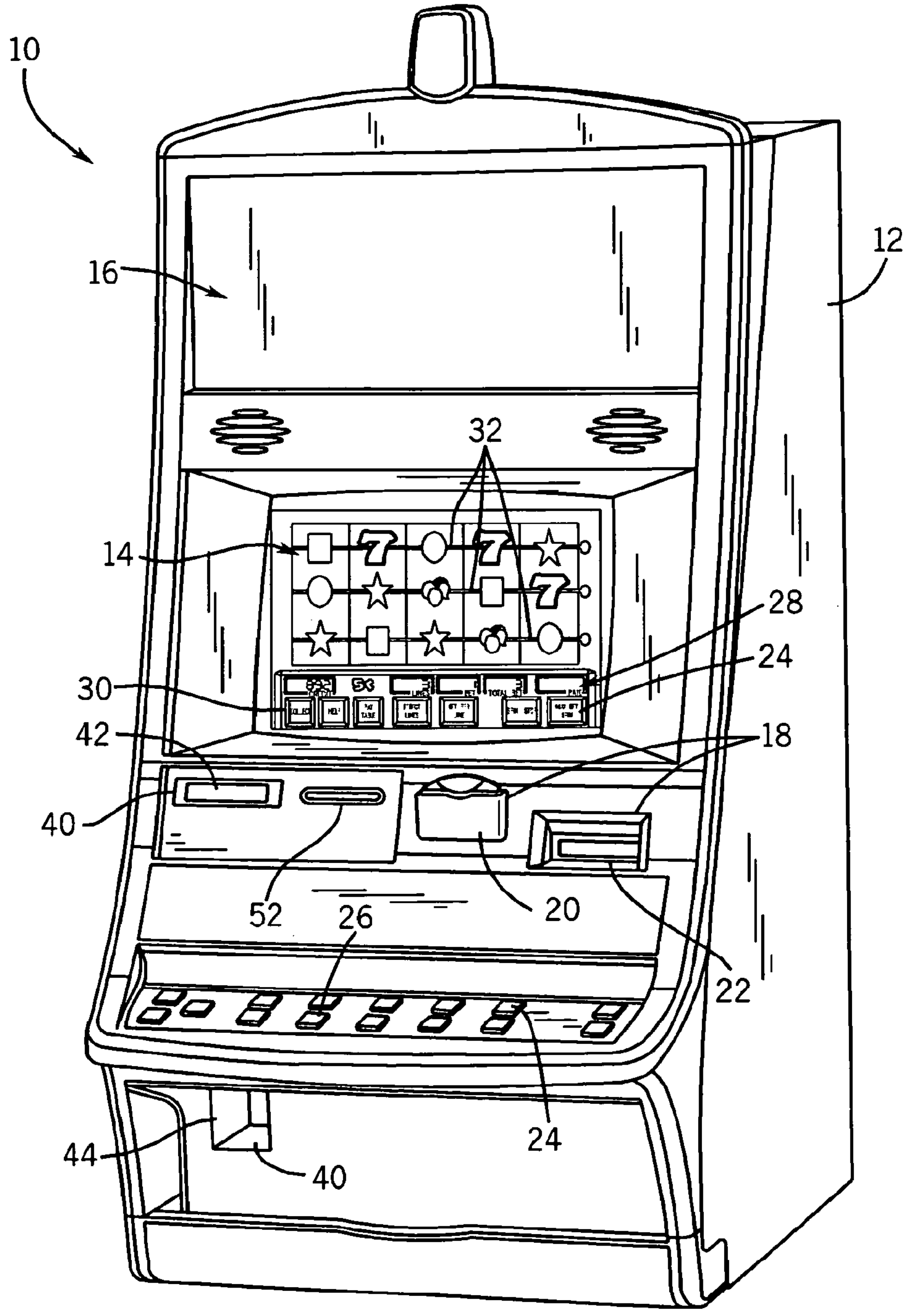
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, and RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
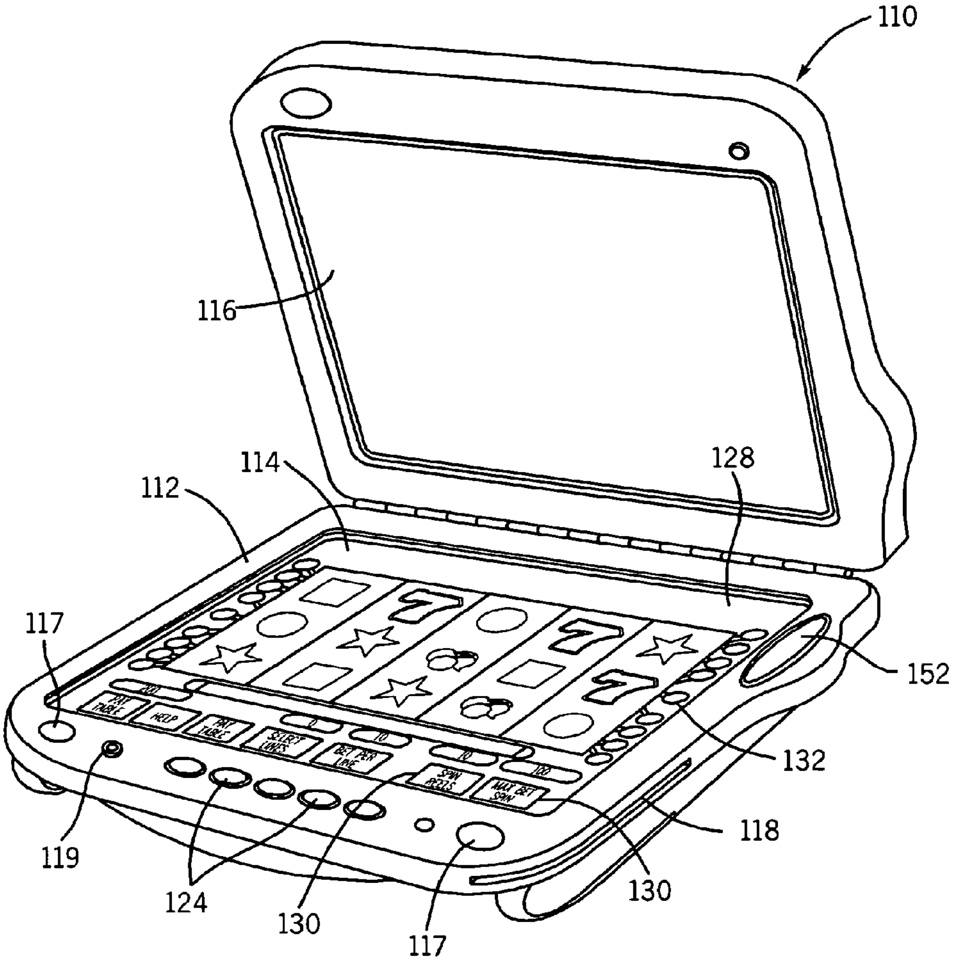
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen mounted to a primary display 114 and/or secondary display 116. In one aspect, the touch screen is matched to a display screen having one or more selectable touch keys 130 selectable by a user's touching of the associated area of the screen using a finger or a tool, such as a stylus pointer. A player enables a desired function either by touching the touch screen at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
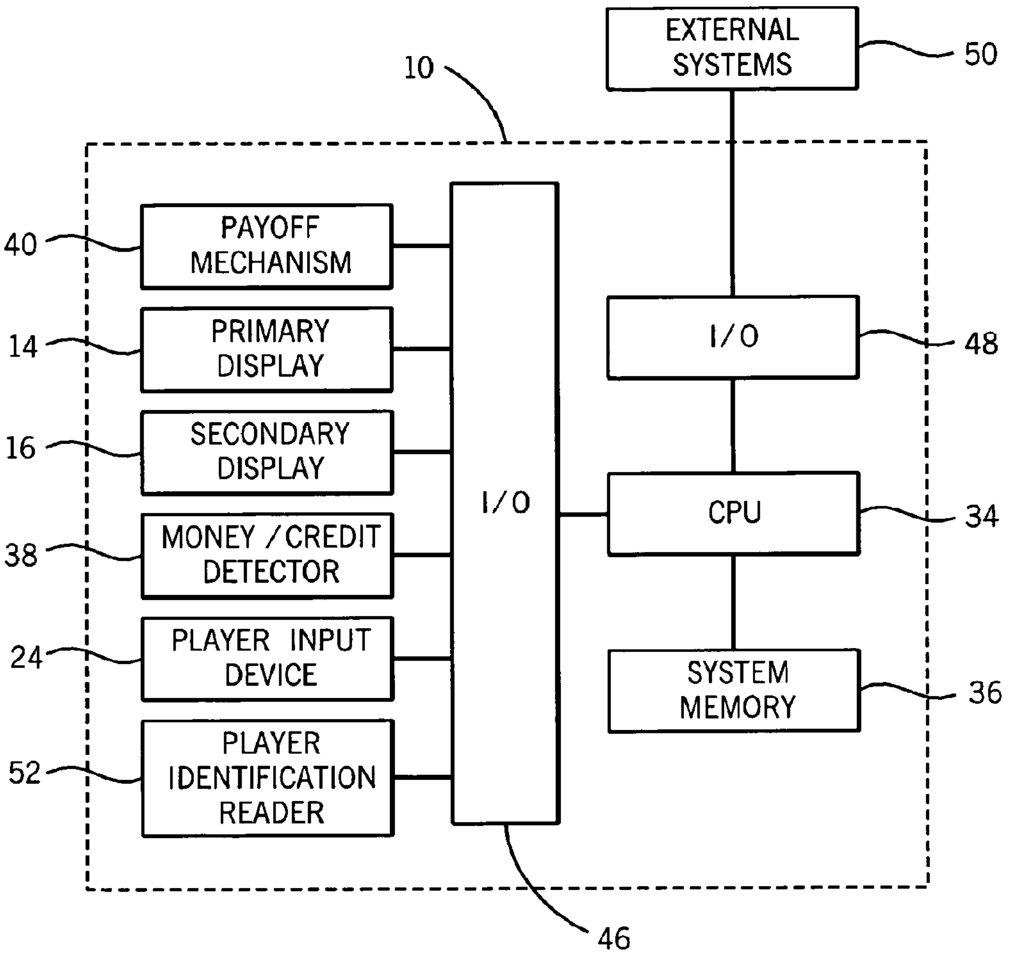
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality there between. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10, 110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
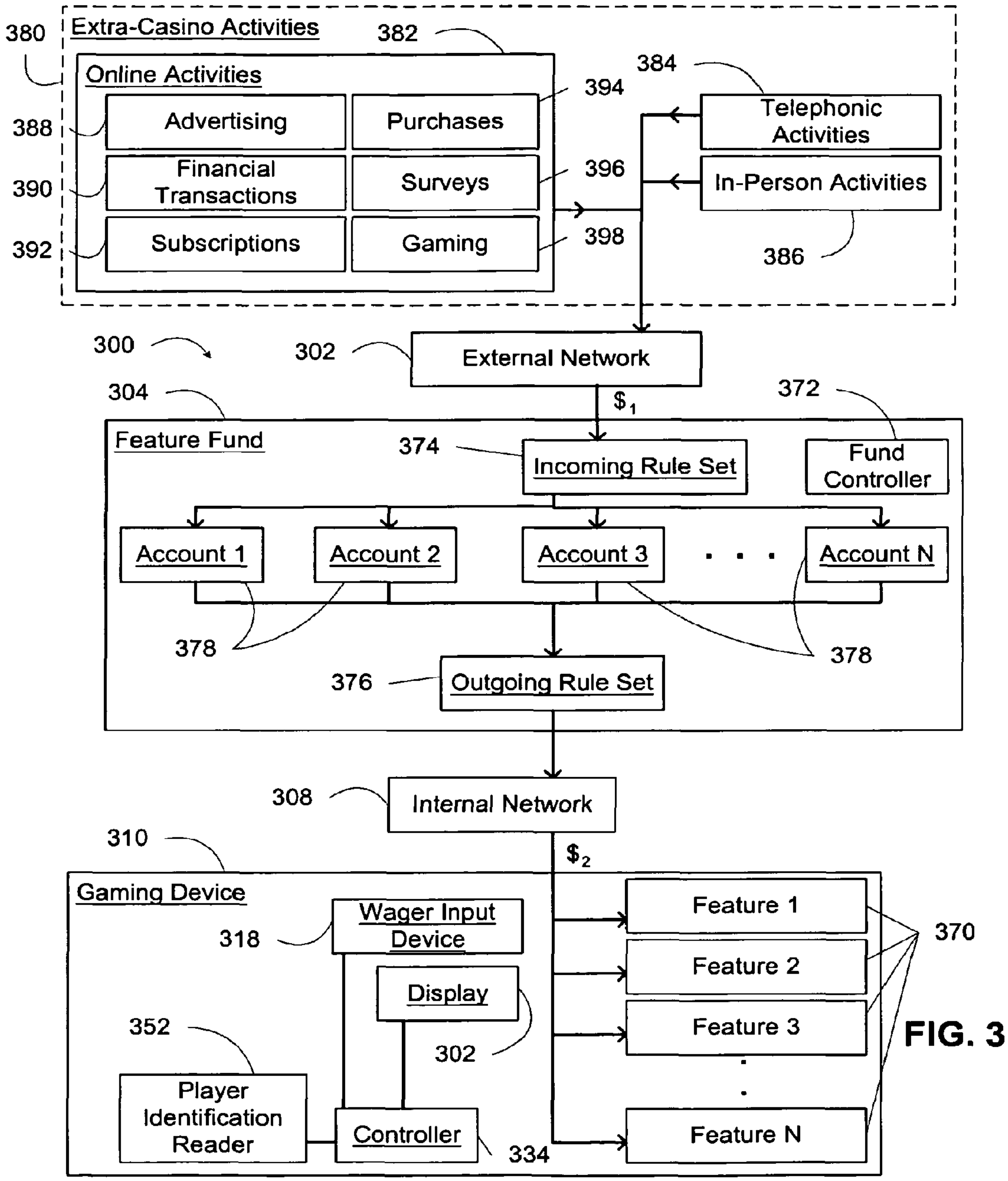
FIG. 3 is a block diagram of a gaming system comprising a feature fund.

Turning now to FIG. 3, a gaming system 300 is shown in which one or more features of wagering games are funded by "extra-casino" activity (activities performed outside of a casino). Extra-casino activity includes online activities, telephonic activities, in-person consumer activities, etc. The gaming system 300 includes an external network 302, a feature fund 304, and at least one gaming device 310 connected to the feature fund 304 by an internal network 308. In an embodiment, the system includes multiple gaming devices 310 in communication with the feature fund 304.

The gaming device 310 in the system 300 may be any gaming device such as those depicted and described with relation to FIGS. 1*a* and 1*b*. The gaming device 310 includes a controller 334, a wager input device 318, a primary display 314, and a player identification reader 352, wherein like reference numerals correspond to like features of the gaming devices in FIGS. 1*a* and 1*b*. The wager input device 318 receives wagers from players to fund execution of one or more wagering games on the gaming device 310. The wagering games are displayed on at least the primary display 314, and optionally on other secondary displays (not shown). The player identification reader 352 is in communication with the controller 334 and is used to identify the player of the gaming device 310 as described herein. The gaming device 310 may execute any variety of wagering games, including at least one basic or primary wagering game and any number of bonus games, and display them on the display 314.

In addition to one or more basic wagering games, a number of wagering game features 370 are available to be activated by a player of the gaming device 310. The features 370 may include any number of improvements, additions, enhancements, or modifications of a standard basic wagering game experience displayed on the gaming device 310. For example, the features 370 may include eligibility or participation in bonus games, progressive jackpots or awards, community games or events, including group games, team competitions, and competitive or collaborative play. The features 370 may also include wagering game assets such as free spins, wild symbols, multipliers, symbol upgrades, expanding wild symbols, scatter symbols, etc. The features 370 may also include eligibility or participation in secondary wagering games, side-bet games, reel re-spins, or extra chances or opportunities during play of the primary wagering games.

In other embodiments, the features 370 which may be activated may include features usable in a selection game, such as additional selections, opportunities to replace or re-do a prior selection, opportunities to undo a poor selection or selection of a terminating symbol, etc. Moreover, the features 370 may include eligibility or participation in enhanced awards, improvements of randomly selected outcomes of a primary wagering game, advancement to higher levels of play, advancement to newer or more favorable episodes of wagering games, etc. In yet other embodiments, features 370 may include eligibility and participation in additional wagering games, other games within a casino or gaming establishment (e.g. other table games or electronic games), wide area progressive jackpots, local area progressive jackpots, tangible prize awards, player reward points and loyalty programs, etc. The features 370 of the wagering game which is activated from the feature fund 304 as described herein may comprise any feature available on a wagering game which might otherwise be funded by an increased wager, a side wager, a secondary or separate wager, via player reward points, or in any other manner utilizing any form of currency, monetary input or other value.

The gaming device 310 is connected to the feature fund 304 via an internal network 308. The internal network 308 may include wired and wireless connections and communications. The internal network 308 may further comprise various network devices including hubs, routers, servers, sub-servers, modems, communication pathways, etc. Portions of the internal network 308 may be housed within a casino or other gaming establishment where one or more gaming devices 310 are located. However, portions of the internal network may be located outside of the casino or gaming establishment for communication with remote gaming devices 310, such as handheld gaming devices, mobile phones, PDAs, computers, and other electronic devices which may act as gaming devices 310. Thus, the internal network 308 is not limited only to components located within a casino, but may further include network components outside of a casino, including the internet, over which communications between the gaming device 310 and the feature fund 304 occur.

A fund controller 372 controls the feature fund 304. The fund 304 and its components may be software components, hardware components, physical components, or combinations of all three. Software components of the feature fund 304 may be stored in memory on any appropriate storage device in communication with fund controller 372, such as on a hard drive or other memory of a server or computer used for managing the feature fund 304. The fund controller 372 may be a separate controller dedicated for processing and managing functions of the feature fund 304, or may be integrated with another controller, such as the controller 334 of one of the gaming devices 310 of the system 300.

The feature fund 304 includes an incoming rule set 374, and outgoing rule set 376, and a plurality of fund accounts 378. The incoming rule set 374 includes one or more sets of rules for managing and distributing incoming fund assets, points or monies. The incoming rule set 374 may be dynamically changed over time or customized by an operator of the system 300. Monies which are received into the feature fund 304 are distributed into one or more accounts 378 of the fund 304 in accordance with the incoming rule set 374. For example, the rule set 374 may include instructions that monies generated through particular extra-casino activities are earmarked or dedicated to be deposited or credited to certain accounts 378. Moreover, monies received from certain individuals, companies, or sponsors may be dedicated toward other accounts 378 by the incoming rule set 374. Thus, as monies are received into the fund, they are banked or deposited in the correct accounts 378 in accordance with the incoming rule set 374.

Similarly, the outgoing rule set 376 functions so as to ensure that monies withdrawn from the feature fund 304 are debited from the correct accounts 378. When a triggering even causes monies in the feature fund 304 to be withdrawn to fund and activate associated wagering game features, the monies withdrawn are removed from accounts 378 in the fund 304 as dictated by the outgoing rule set. If the feature triggered is a particular bonus feature, for example a "Monopoly Big Event" feature, then monies from the fund 304 used to fund the triggered feature may be withdrawn from the "Monopoly Big Event" account 378. In this way, certain features may be associated with certain accounts 378 of the fund 304. Moreover, some features may be associated with multiple accounts 378 of the fund 304. For example, if a particular feature is triggered which is a progressive jackpot having a "Monopoly" theme, a portion of the money necessary to fund the feature may be withdrawn from a "Monopoly" account 378 and another portion withdrawn from a "Progressive" account 378, because the feature triggered falls into both categories. Features falling into three, four, or even more account 378 categories are also possible. In each instance, however, the monies withdrawn from the feature fund 304 are done so in accordance with the outgoing rule set 376.

The feature fund 304 is also connected to a plurality of external funding sources through an external network 302. The external network 302 may include wired and wireless connections and communications. The external network 302 may further comprise various network devices including hubs, routers, servers, sub servers, modems, communication pathways, etc. Portions of the external network 308 may be housed within a casino or other gaming establishment where one or more gaming devices 310 are located. However, portions of the external network 302 may be located outside of the casino or gaming establishment for communication with remote servers, computers, gaming devices, and other electronic devices which participate in the extra-casino activities. Communications over the external network may occur over utilizing different protocols and formats, including internet communications. The external network 302, although largely located outside of a casino, is not limited to only components located outside of a casino, but may include network components located inside of a casino so as to communicate with the feature fund 304.

A plurality of funding sources 380 are in communication with the feature fund 304 via the external network 302. The funding sources 380 comprises extra-casino activities which are performed in whole or in part outside of a casino or gaming operator's facility. Thus, for example, the extra-casino activities include online activities 382, telephonic activities 384 and in-person activities 386. Online activities 382 includes advertising 388, financial transactions 390, subscriptions 392, online purchases 394, surveys 396, and online gaming 398. Other possible online activities 382 may be utilized as well and the varieties described herein and depicted in FIG. 3 are provided by way of non-limiting examples.

Each of these online activities 382 generates monies in one or more ways. For example, online advertising 388 generates money from advertisers who pay fees to website operators to post website, banner ads, or other advertising on the operators site. Financial transactions 390 may generate money through fees charged for certain transactions or interactions, such as for deposits, withdrawals, checking balances, or for buying or selling stocks, bonds, or other securities. Subscriptions 392 may generate fees associated with enrolling or maintaining enrollment of a subscriber in a service, for example, a book club, a travel organization, or a news service. Purchases 394 generate income by delivering goods purchased online to a consumer in exchange for receiving money from such person. Any variety of goods or services may be purchased online and qualify as purchasing activity 394. Surveys 396 may generate income by allowing those seeking feedback from consumers to pay a fee (to a website operator or other) in exchange for receiving responses to survey questions or other opinion input from an online user. Another example of online activity 382 is online gaming 398 or gambling, for example, an internet casino, which generates fees collected as wagers from online players.

Similarly, the other extra-casino activities generate fees. Telephonic activities 384 may generate fees for use of long distance, toll or other services, or simply as a fee for performing certain tasks telephonically, for example performing financial transactions telephonically. In-person activities 386 may include purchases made at "brick and mortar" stores or service providers, or other transactions performed in person and generating a fee. For example, if an individual signs up for membership for a frequent flier program with an airline in person at the airport, a fee may be paid by the airline gaining the new member into the feature fund 304 and deposited into a particular account 378 where it is eligible to be later utilized or withdrawn by the member during a wagering game activity, as explained in detail herein. Many other in-person activities 386 may be utilized to collect one or more fees which are deposited into the feature fund 304.

In operation, as seen in FIG. 3, the system 300 delivers monies generated through extra-activities into the feature fund 304 where they are then redistributed and used to fund wagering game features at one or more gaming devices 310. Each quantity of money or fee earned through extra-casino activities, i.e. each "first sum" ($\$_1$) is received over the external network 302 and into the feature fund 304. Each such first sum is then processed in accordance with the first or incoming rule set 374 and allocated, credited to, or deposited in one or more of the accounts 378 of the feature fund 304. When a player at a gaming device 310 of the system 300 is desirous of activating one or more supplemental features 370 available, if eligibility requirements are satisfied, monies from the accounts 378 of the fund 304 may be used to fund such features 370 so as to eliminate the need for the player to place an extra wager or increased wager, for example. In this way, the accounts 378 fund the "cost" of the additional activated features 370 without the need for a player to directly fund the features 370.

Eligibility may include a player's eligibility to activate or receive the feature 370 which he desires to employ, as well as eligibility of the feature 370 itself to be employed in the manner desired. For example, players may be restricted by play levels, reward points, time on device, wager level, game episodes, or other criteria from using certain features 370. Moreover, certain features 370 may be restricted so as to be available to players only if certain criteria are met, such as bet level, time on device, player award level, other features 370 activated, etc. If all eligibility requirements are satisfied, then the player may utilize a "second sum" ($\$_2$) from the feature fund 304 to fund and activate the desired feature 370. The second sum will be debited from, withdrawn, deducted, and/or removed from the appropriate one or more accounts 378 and used to fund the activated feature. The determination of which accounts 378 and what amounts are withdrawn to fund the second sum is made by a second or outgoing rule set 376 of the feature fund 304, under control of the fund controller 372.

It should be understood that the monies received into and debited from the feature fund 304 may be actual money stored in the fund 304, representations of money credited to and debited from the fund 304 but stored elsewhere, or may even be points, credits, or other token economy measurement. In other words, when a first sum ($\$_1$) is received into the fund 304, the currency itself need not be received, but rather just an accounting of its receipt is necessary. Similarly, when a second sum ($\$_2$) is debited from the fund 304, an accounting of such a reduction needs to be recorded under control of the fund controller 372. However, such additions and subtractions from the fund can be accounted for in any variety of manners, including points, awards, tokens, credits, or currency, which may be from time to time converted into other currencies, points, tokens, or awards. The fund 304 must, however, keep accurate records of inbound and outbound credits and debits, and how such credits and debits have been allocated to one or more accounts 378 of the fund 304.

Figure 4:
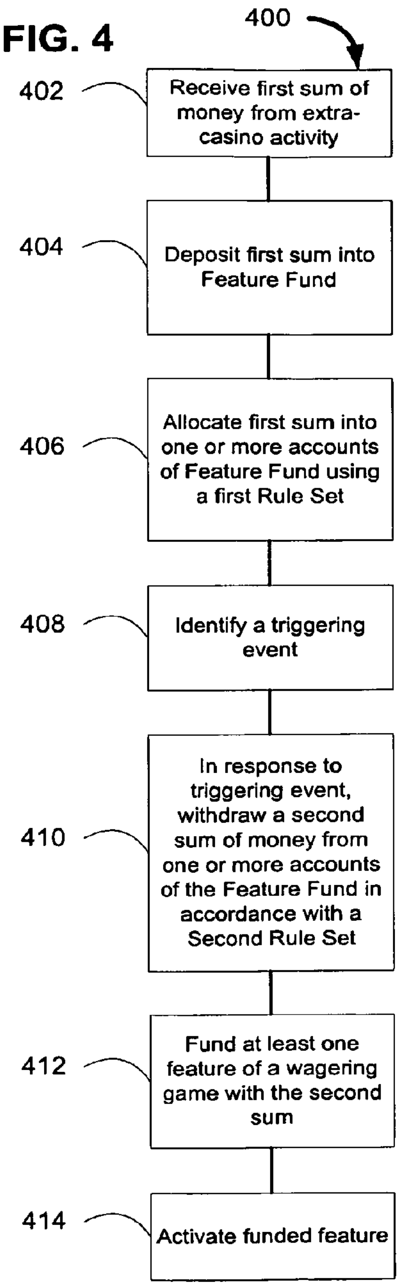
FIG. 4 is a flowchart of a method of funding features of a wagering game.

Turning to FIG. 4, a flowchart of a method 400 of funding features of a wagering game is depicted. At step 402, a first sum of money is received from one or more extra-casino activities, as described in relation to FIG. 3. The first sum received is deposited into a feature fund in step 404. In step 406, the first fund is allocated into one or more accounts of the feature fund in accordance with a first rule set, for example the inbound rule set of FIG. 3. In step 408, a triggering event is identified. The triggering event may comprise any number of events which trigger eligibility of a feature of the wagering game, and the funding of the feature from the feature fund. In step 410, a second sum of money is withdrawn from one or more accounts of the feature fund in accordance with a second rules set, for example the outbound rule set of FIG. 3. In step 412, the second sum is used to fund a purchase price, or activation amount of the desired feature of the wagering game. In step 414, because the second sum has been received, the desired feature is activated for use in the wagering game.

Figure 5:
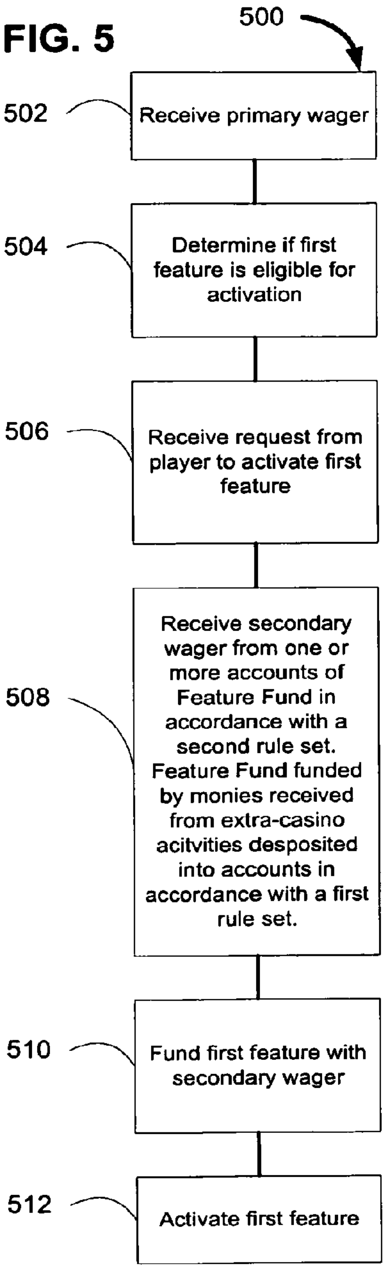
FIG. 5 is a flowchart of a method of operating a wagering game.

In FIG. 5, a flowchart of a method 500 of operating a wagering game is depicted. At step 502, a primary wager is received from a player. The wager may be received via any appropriate wager input device, for example the wager input device 318 of the gaming device 310 in FIG. 3. At step 504, a determination of eligibility if made to determine whether or not a first feature of the wagering game is eligible for activation. At step 506, a request from the player to activate the first feature is received. At step 508, a secondary wager is received from one or more accounts of a feature fund in accordance with a second rule set. The feature fund is funded by extra-casino activities generating monies deposited into one or more accounts of the feature fund in accordance with a first rule set. At step 510, the first feature is funded by the secondary wager received from the feature fund. At step 512, having been funded, the first feature is activated.

Thus, it should be understood that the system 300 in FIG. 3 may be used to execute and perform the methods 400,500 depicted in FIGS. 4 and 5. The steps of the two methods 400,500 may be performed on the various components of the system 300 as described herein with relation to FIG. 3. However, in alternative embodiments, one or more of the steps of the two methods 400,500 may be performed by components outside of the system 300 depicted and described with relation to FIG. 3. For example, computers in communication with the system 300, including a home computer connected to the system 300 via the internet, may perform one or more of the steps of the methods 400,500 depicted.

It should also be understood that the features 370 activated in the system 300 of the present invention may be any number of available wagering game features as described herein. Moreover, the features 370 may include any enhancements or additions to the primary wagering game as described in detail in U.S. Patent Application Ser. No. 60/844,032 filed on Sep. 12, 2006, and US. Patent Application Ser. No. 60/802,984 filed on May 24, 2006, both of which are assigned to WMS Gaming Inc. Both such applications are hereby incorporated by reference in their entirety as if full set forth herein.

The system 300 of the present invention offers a number of advantages over traditional gaming systems. Traditionally, supplemental features as the features of the wagering game described herein, are funded directly by a player of the wagering game. This is traditionally accomplished by requiring the player to make an extra wager, an increased wager, a side-bet, or otherwise make payment for activation of the feature. The present invention offers an improvement by funding the features through the feature fund. Monies are generated from a vast array of extra-casino activities and deposited into the feature fund. As online activities and transactions continue to increase this allows players who otherwise perform online activities to benefit from such activities by having monies deposited into accounts of the feature fund from which they are eligible to "withdraw" or otherwise use or activate. Thus, when a player returns to a casino after accumulating monies into the feature fund, the player may activate extra features at no additional cost to the player. The features are funded from the feature fund indirectly through the player's extra-casino activities, rather than directly by the player as traditionally done. This gives the player the sensation that he is receiving a benefit for little or no cost, and increases his or her enjoyment of the wagering game. Moreover, it gives the player a perceived increased status or "VIP" sensation and is funded by activities in which the player would likely engage anyway. In these and other ways, the system of the present invention offers an improved method of funding features of wagering games.

Each of these embodiments and obvious variations thereof is contemplated as falling within the spirit and scope of the claimed invention, which is set forth in the following claims.

What is claimed is:

1. A gaming system, comprising:

a regulated gaming machine primarily dedicated to playing a casino wagering game, the gaming machine including a cabinet with one or more electronic display devices and one or more electronic input devices coupled to the cabinet; and game-logic circuitry configured to:

detect, via at least one of the one or more electronic input devices, a physical item associated with a monetary value that establishes a credit balance;

initiate the casino wagering game in response to an input indicative of a wager covered by the credit balance;

receive extra-casino activity monies generated from one or more extra-casino activities associated with one or more players;

direct at least one of the one or more electronic display devices to display an outcome of the casino wagering game;

in response to a triggering event during play of the casino wagering game, fund a game feature of the casino wagering game with at least a portion of the received extra-casino activity monies;

activate the funded game feature; and receive, via at least one of the one or more electronic input devices, a cashout input that initiates a payout from the credit balance.

2. The gaming system of claim 1, further comprising a fund controller configured to deposit the extra-casino activity monies into one or more feature fund accounts prior to funding the game feature of the casino wagering game, the game feature being associated with at least one of the one or more feature fund accounts.

3. The gaming system of claim 1, wherein the game-logic circuitry is further configured to select the game feature from a plurality of available game features associated with the casino wagering game.

4. The gaming system of claim 3, wherein each of the available game features of the casino wagering game is associated with a distinct one of a plurality of feature fund accounts.

5. The gaming system of claim 3, wherein the game feature of the casino wagering game is associated with more than one of a plurality of feature fund accounts.

6. The gaming system of claim 1, further comprising a fund controller configured to deposit the extra-casino activity monies into a player account associated with a player at the regulated gaming machine prior to funding the game feature of the casino wagering game, the game feature being associated with the player account.

7. The gaming system of claim 1, wherein the one or more extra-casino activities comprise online activities.

8. The gaming system of claim 1, wherein the extra-casino activity monies includes currency, points, credits, or any combination thereof.

9. The gaming system of claim 1, wherein the activating the funded game feature includes modifying one or more aspects of the casino wagering game.

10. The gaming system of claim 1, wherein the activating the funded game feature includes initiating for a player at the regulated gaming machine a bonus game, a progressive jackpot, a community game, a secondary wagering game, or any combination thereof.

11. The gaming system of claim 1, wherein the game-logic circuitry is further configured to determine eligibility of a player to activate the game feature, and wherein the funding and the activating occur only if the player is determined to be eligible to activate the game feature.

12. The gaming system of claim 1, further including a random element generator configured to generate one or more random elements, the outcome being determined based, at least in part, on the one or more random elements.

13. The gaming system of claim 12, wherein the random element generator and the game-logic circuitry reside within the cabinet of the regulated gaming machine.

14. A regulated electronic gaming machine primarily dedicated to playing a casino wagering game, the electronic gaming machine comprising:

one or more electronic display devices;

one or more electronic input devices; and game-logic circuitry configured to:

detect, via at least one of the one or more electronic input devices, a physical item associated with a monetary value, the monetary value establishing a credit balance that changes based on play of the casino wagering game;

receive, via at least one of the one or more electronic input devices, an input from a player indicative of a wager to initiate the casino wagering game;

initiate the casino wagering game in response to the input indicative of the wager, the wager being covered by the credit balance;

receive, from an external feature fund, extra-casino activity monies generated from an extra-casino activity of the player;

direct at least one of the one or more electronic display devices to display a randomly determined outcome of the casino wagering game;

in response to a triggering event during play of the casino wagering game, fund a game feature of the casino wagering game with at least a portion of the received extra-casino activity monies;

activate the funded game feature; and receive, via at least one of the one or more electronic input devices, a cashout input that initiates a payout from the credit balance.

15. The electronic gaming machine of claim 14, wherein the game-logic circuitry is further configured to select the game feature from a plurality of available game features associated with the casino wagering game.

16. The electronic gaming machine of claim 15, wherein each of the available game features of the casino wagering game is associated with a distinct one of a plurality of feature fund accounts.

17. The electronic gaming machine of claim 15, wherein the game feature of the casino wagering game is associated with more than one of a plurality of feature fund accounts.

18. The electronic gaming machine of claim 14, wherein the extra-casino activity comprises one or more online activities.

19. The electronic gaming machine of claim 14, wherein the extra-casino activity monies includes currency, points, credits, or any combination thereof.

20. A method of operating a gaming system, the gaming system including game-logic circuitry and a regulated gaming machine, the gaming machine being primarily dedicated to playing at least one casino wagering game, the gaming machine including one or more electronic display devices and one or more electronic input devices, the method comprising:

detecting, via at least one of the one or more electronic input devices of the regulated gaming machine, a physical item associated with a monetary value that establishes a credit balance;

initiating, via the game-logic circuitry, the casino wagering game in response to an input indicative of a wager covered by the credit balance;

receiving, from one or more feature fund accounts, extra-casino activity monies generated from one or more extra-casino activities associated with one or more players;

displaying, via at least one of the one or more electronic display devices of the regulated gaming machine, an outcome of the casino wagering game;

in response to a triggering event during play of the casino wagering game, funding a game feature of the casino wagering game with at least a portion of the received extra-casino activity monies;

activating the funded game feature; and receiving, via at least one of the one or more electronic input devices, a cashout input that initiates a payout from the credit balance.

* * * * *